US011068229B2

(12) United States Patent
Iwamoto

(10) Patent No.: US 11,068,229 B2
(45) Date of Patent: Jul. 20, 2021

(54) ELECTRONIC DEVICE, CONTROL SYSTEM AND CONTROL METHOD

(71) Applicant: Toshiba Client Solutions CO., LTD., Tokyo (JP)

(72) Inventor: Rinzo Iwamoto, Tokyo (JP)

(73) Assignee: Toshiba Client Solutions, CO., LTD., Tokyo (JP)

(*) Notice: Subject to any disclaimer, the term of this patent is extended or adjusted under 35 U.S.C. 154(b) by 347 days.

(21) Appl. No.: 16/041,115

(22) Filed: Jul. 20, 2018

(65) Prior Publication Data
US 2019/0235827 A1 Aug. 1, 2019

(30) Foreign Application Priority Data
Jan. 31, 2018 (JP) .............................. JP2018-014661

(51) Int. Cl.
| | |
|---|---|
| *H04L 29/06* | (2006.01) |
| *G06F 3/16* | (2006.01) |
| *G06F 21/31* | (2013.01) |
| *G06F 21/62* | (2013.01) |
| *G06F 21/85* | (2013.01) |

(52) U.S. Cl.
CPC .............. *G06F 3/165* (2013.01); *G06F 21/31* (2013.01); *G06F 21/6236* (2013.01); *G06F 21/85* (2013.01)

(58) Field of Classification Search
CPC ...... G06F 3/165; G06F 21/31; G06F 21/6236; G06F 21/85; G06F 21/30; H04L 63/0838
See application file for complete search history.

(56) References Cited

U.S. PATENT DOCUMENTS

2016/0165645 A1* 6/2016 Commons ............... H04W 8/24
455/420
2018/0167228 A1* 6/2018 Elcock ................ H04L 12/2823

FOREIGN PATENT DOCUMENTS

| JP | 2001-005580 A | 1/2001 |
|---|---|---|
| JP | 2001-005594 A | 1/2001 |

* cited by examiner

*Primary Examiner* — Yogesh Paliwal
(74) *Attorney, Agent, or Firm* — Knobbe, Martens, Olson & Bear, LLP

(57) ABSTRACT

According to one embodiment, a control system includes a first electronic device and a second electronic device connectable to the first electronic device via an audio cable. The first electronic device generates first sound data encoded with status information indicative of a state of the first electronic device, and transmits the first sound data to the second electronic device via the audio cable. The second electronic device receives the first sound data from the first electronic device via the audio cable, acquires the status information by decoding the first sound data, and displays the status information on a screen of the second electronic device.

9 Claims, 12 Drawing Sheets

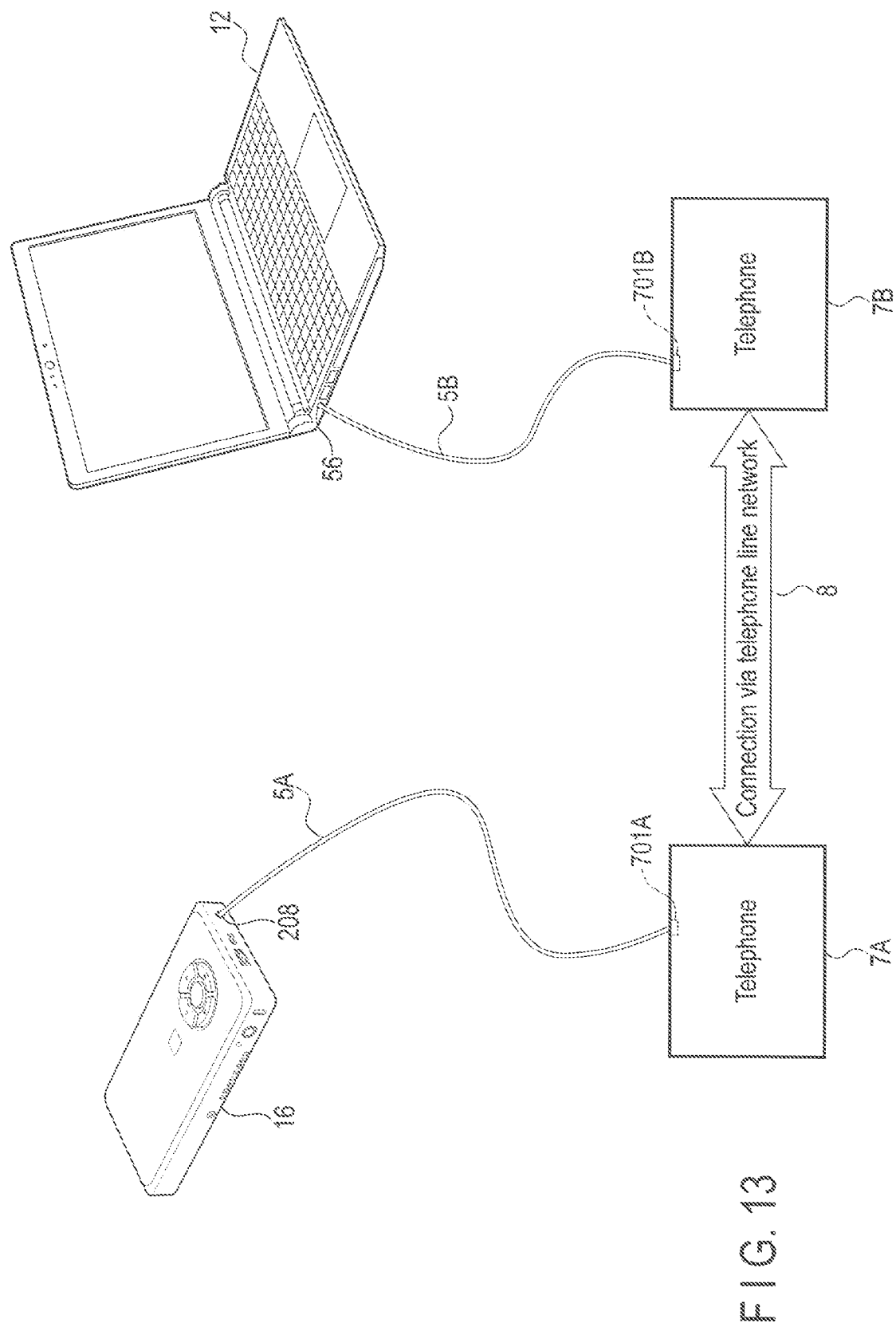
F I G. 13

ELECTRONIC DEVICE, CONTROL SYSTEM AND CONTROL METHOD

CROSS-REFERENCE TO RELATED APPLICATIONS

This application is based upon and claims the benefit of priority from Japanese Patent Application No. 2018-014661, filed Jan. 31, 2018, the entire contents of which are incorporated herein by reference.

FIELD

Embodiments described herein relate generally to an electronic device, a control system and a control method.

BACKGROUND

Recently, an IoT (Internet of Things) age in which many things are connected through the Internet has come. A technique called "edge computing" is required as a tool for network communication and information sharing in offices, factories, and in other various situations. In order to realize the edge computing, development of a practical mobile edge computing device having high degrees of versatility and processing capacity and can be used by a worker (user) on site is needed separately from a data center (or cloud). Thereby, it is expected that promotion of the operational efficiency and productivity improvement at a workplace and the like or load dispersion of data and improvement in a network environment or the like will be achieved.

The status of an IoT device such as MECD is generally acquired via a wireless network such as a wireless LAN or Bluetooth (registered trademark). An external device such as a server that manages the IoT device can check the status of the IoT device via the wireless network.

Further, in the IoT device, by connecting a keyboard or a pointing device to a USE (registered trademark) port and connecting a display to a display port, the user can operate the IoT device. For example, the user can display the status on the screen of the display.

However, in the state or environment where the wireless network is unavailable, external devices such as servers cannot check the status of the IoT device. In addition, for the purpose of security such as protecting data in the IoT device, use of the USE port and the display port provided in the IoT device may be prohibited. In this case, it is impossible to check the status of the IoT device on a display connected to the IoT device.

By contrast, audio input/output ports used for connecting microphones, headphones, speakers and the like are unlikely to be prohibited from being used for security purposes. Thus, it is required to realize a new function that can control a status by connecting between devices using an audio cable.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 13 is a diagram for describing a configuration of a control system including an electronic device according to a third embodiment.

DETAILED DESCRIPTION

Figure 1:
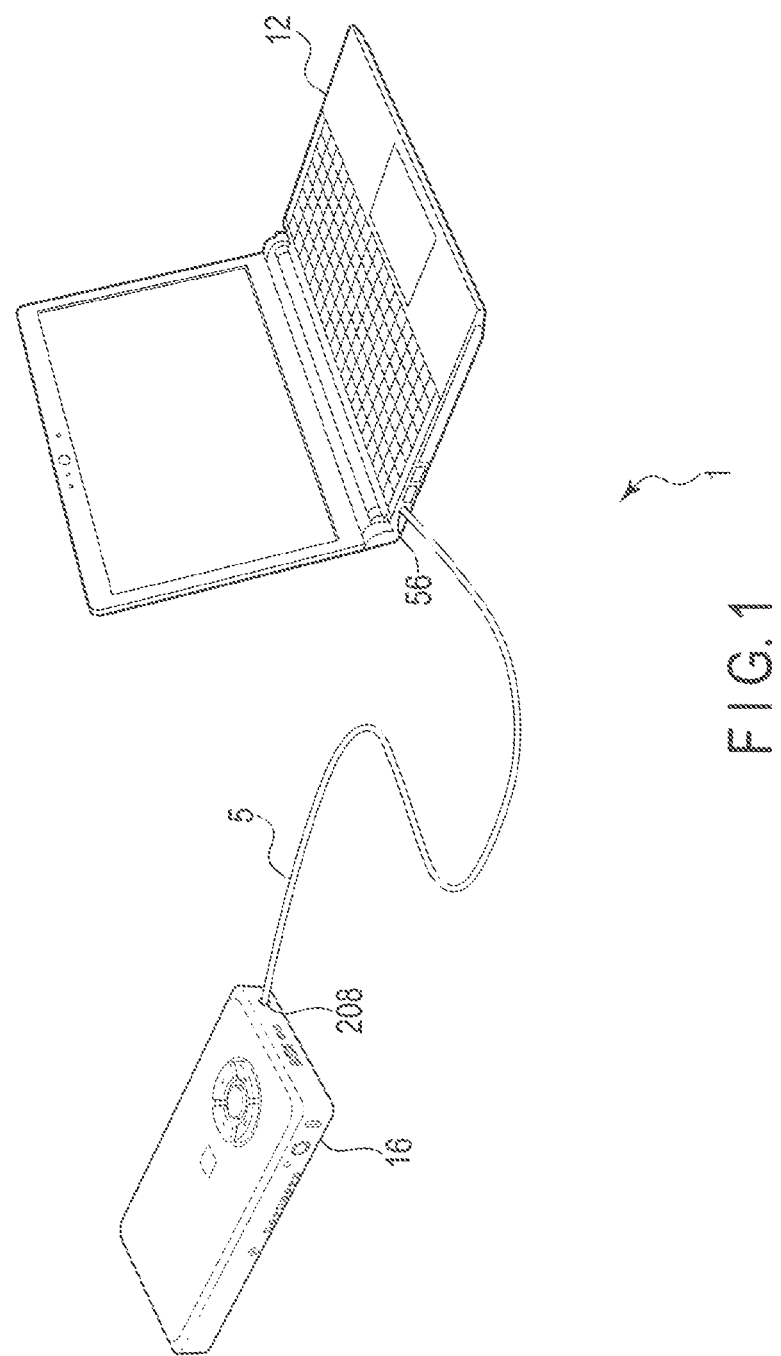
FIG. 1 is an exemplary diagram for describing a configuration of a control system including an electronic device (mobile PC) according to a first embodiment.

Various embodiments will be described hereinafter with reference to the accompanying drawings.

Hereinafter, embodiments will be described with reference to the drawings. Note that the disclosure is merely an example, and the invention is not limited by the content described in the following embodiments. Naturally, the modifications easily conceivable by those skilled in the art are included in the scope of the disclosure. In order to make the description clearer, there are cases where the size, shape, etc., of each part in the drawings are schematically represented by changing them relative to the actual embodiment. In a plurality of drawings, corresponding elements are denoted by the same reference numerals, and a detailed explanation may be omitted.

In general, according to one embodiment, a control system includes a first electronic device and a second electronic device connectable to the first electronic device via an audio cable. The first electronic device generates first sound data encoded with status information indicative of a state of the first electronic device, and transmits the first sound data to the second electronic device via the audio cable. The second electronic device receives the first sound data from the first electronic device via the audio cable, acquires the status information by decoding the first sound data, and displays the status information on a screen of the second electronic device.

First Embodiment

[Control System]

First, referring to FIG. 1, a configuration of a control system 1 including an electronic device according, to an embodiment will be described. This electronic device is an electronic device that can be carried by a user and can be realized as a mobile personal computer (PC) including a mobile edge computing device (MECD), or a mobile information terminal such as a smartphone, a mobile phone, a PDA, and the like. Hereinafter, a case where this electronic device is realized as a mobile PC 16 will be exemplified.

The control system 1 includes the mobile PC 16 and a display/setting PC 12. The display/setting PC 12 is an electronic device including a display, and can be realized as, for example, a notebook PC, a desktop PC, or an embedded system incorporated in various electronic devices. The display/setting PC 12 may be realized as a portable information terminal such as a tablet PC, a smartphone, a mobile phone, a PDA, or the like. FIG. 1 exemplifies a case where the display setting PC 12 is a notebook type PC.

The mobile PC 16 and the display/setting PC 12 are connected via an audio cable 5. The mobile PC 16 and the display/setting PC 12 can mutually transmit and receive sound data via the audio cable 5.

In general, the display/setting PC 12 acquires status information indicative of a state of the mobile PC 16 via a wireless network such as a wireless LAN or Bluetooth. The display/setting PC 12 displays the acquired status information on a screen of a display built in the display/setting PC 12. Thus, the user can check the state of the mobile PC 16. The setting PC 12 may display the status information on a screen of an external display connected using an HDMI (registered trademark) connector or the like instead of a built-in display.

Further, with the mobile PC 16, for example, a display may be connected to a display port, a keyboard or a pointing device may be connected to a USB port, and a display may be connected to a display port. The user can operate the connected keyboard or the IoT device and display, for example, status information on the screen of the connected display.

However, in the state or environment where the wireless network cannot be used, the display/setting PC 12 cannot check the status information of the mobile PC 16. Further, for the purpose of security such as protecting data in the mobile PC 16, use of the USB port and the display port provided in the mobile PC 16 may be prohibited. In this case, it is also impossible to check the status of the mobile PC 16 on a display connected to the mobile PC 16.

By contrast, sound input/output ports used for connecting microphones, headphones, speakers and the like are unlikely to be prohibited from being used for security purposes. Sound data is mutually transmitted and received between the display/setting PC 12 and the mobile PC 16 via the audio cable 5 connecting the audio input/output port of the mobile PC 16 (for example, headphone/microphone port 208) and the audio input/output port of the display/setting PC 12 (for example, headphone/microphone port 56). As a result, the display/setting PC 12 can perform control regarding the status of the mobile PC 16.

Hereinafter, each of the above-described configuration will be described more specifically.

[Display/Setting PC 12]

Figure 2:
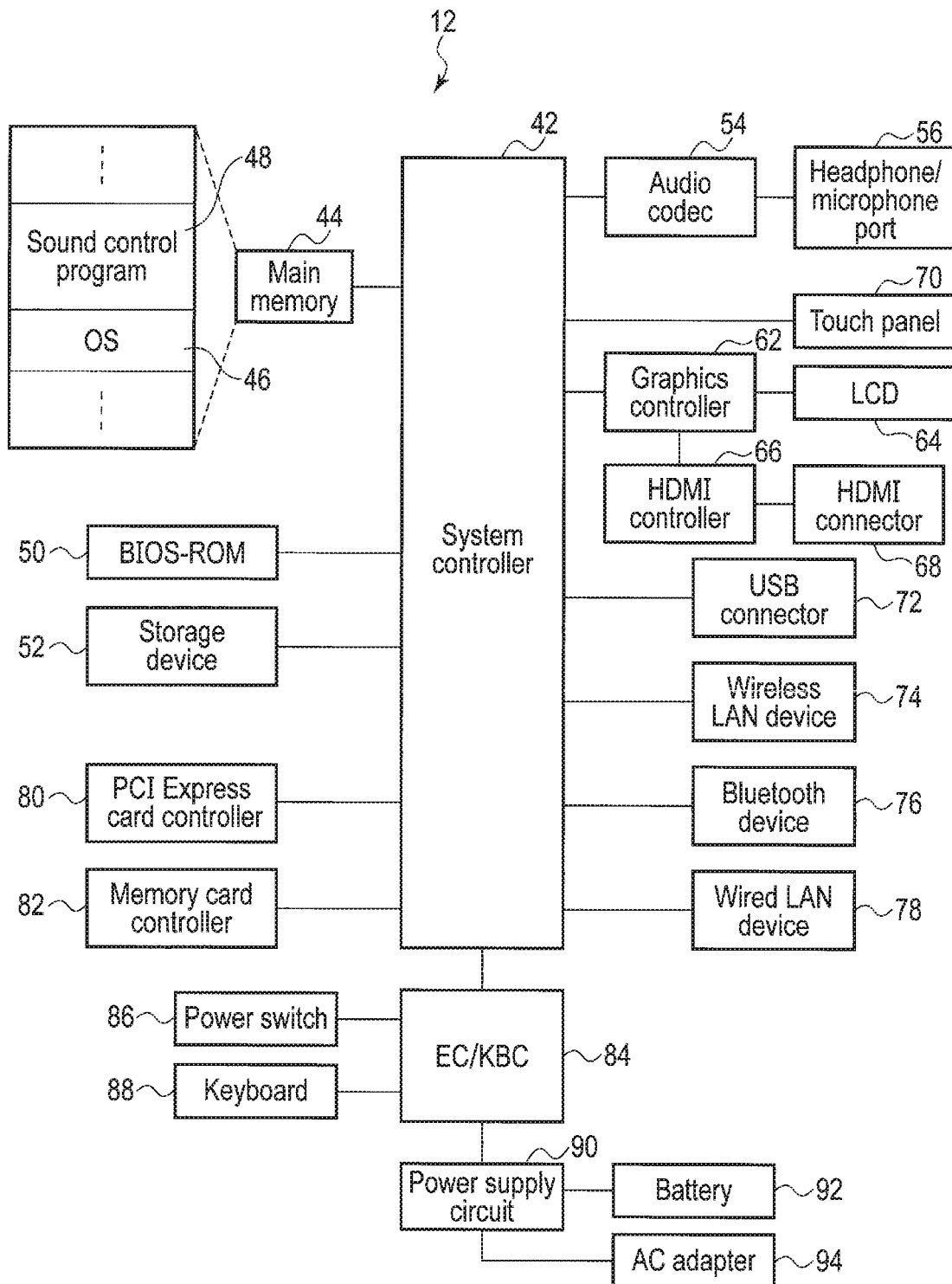
FIG. 2 is a block diagram showing an example of a system configuration of a display/setting PC in the control system of FIG. 1.

FIG. 2 shows a system configuration of the display/setting PC 12. The display/setting PC 12 includes a system controller 42 including a processor. A main memory 44, a BIOS-ROM 50, a storage device 52 including an HDD or an SSD, an audio codec 54, a graphics controller 62, a touch panel 70, a USB connector 72, a wireless LAN device 74, a Bluetooth device 76, a wired LAN device 78, a PCI Express (registered trademark) card controller 80, a memory card controller 82, an embedded controller/keyboard controller (EC/KBC) 84, and the like are connected to the system controller 42.

The system controller 42 executes various programs loaded from the storage device 52 into the main memory 44. These programs include an operating system (OS) 46 and a sound control program 48 for control using sound data. The system controller 42 controls the operation of each component in the display/setting PC 12 by executing instructions included in the sound control program 48.

The system controller 42 also executes a basic input/output system (BIOS) stored in the BIOS-ROM 50 which is a nonvolatile memory. The BIOS is a system program for hardware control.

The audio codec 54 converts a digital audio signal (sound data) into an analog audio signal and supplies (output) the converted analog signal to a headphone/microphone port 56 or a speaker 60. Further, the audio codec 54 converts an analog audio signal input via the headphone/microphone port 56 into a digital audio signal. The headphone/microphone port 56 is also referred to as an audio jack and may be a speaker/microphone port. Further, instead of the headphone/microphone port 56, a microphone port and a headphone port (or a speaker port) may be separately provided.

The graphics controller 62 controls a liquid crystal display (LCD) 64 used as a display monitor of the display/setting PC 12. The touch panel 70 is overlaid on the screen of an LCD 64 so that handwriting input operation with a touch pen or the like can be performed on the screen of the LCD 64. An HDMI (registered trademark) controller 66 is also connected to the graphics controller 62. The HDMI controller 66 is connected to an HDMI connector 68 for connection with an external display device.

The wireless LAN device 74 executes wireless LAN communication conforming to the IEEE 802.11 standard for connection with a network. The Bluetooth device 76 executes wireless communication conforming to the Bluetooth standard for connection with the external device. The wired LAN device 78 executes the wired LAN communication conforming to the IEEE 802.3 standard for connection with the network. In this manner, connection between the display/setting PC 12 and the network may be made by wireless communication or may be made wired communication.

The PCI Express card controller 80 performs communication conforming to the PCI Express standard between the display/setting PC 12 and the external device. The memory card controller 82 writes data to a storage medium, for example, a memory card such as an SD (secure digital) card (registered trademark), and reads the data from the memory card.

The EC/KBC 84 is a power management controller, and is realized as a one-chip microcomputer incorporating therein also a keyboard controller configured to control a keyboard 88. The PC/NBC 84 has a function of powering on or powering off the display/setting PC 12 according to an operation of a power switch 86. Control of the power-on and power-off is executed by the cooperation between the EC/KBC 84 and a power circuit 90. Even while the display/setting PC 12 is in the power-off state, the EC/KBC 84 operates by power from a battery 92 or AC adaptor 94. The power circuit 90 uses the power from the battery 92 or power from the AC adaptor 94 to be connected as an external electric power supply to generate the power to be supplied to each component.

[Mobile PC 16]

Figure 3:
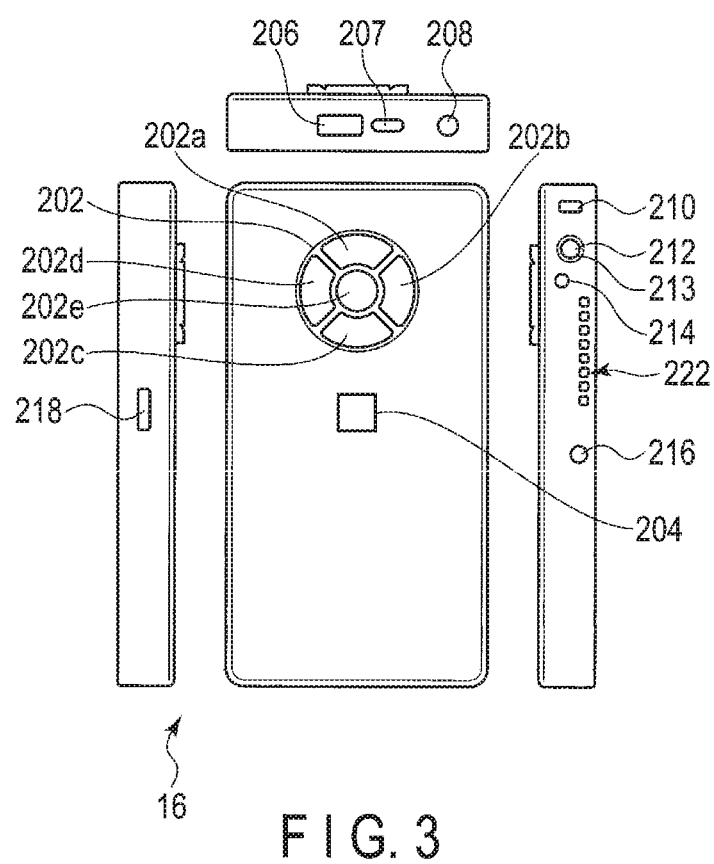
FIG. 3 is a view showing an example of an external appearance of a front face, a side face, and a top face of the electronic device of the first embodiment.

FIG. 3 shows an example of an external appearance of the mobile PC (mobile edge computing device) 16. The mobile PC 16 is a small-sized PC that can be held by one hand, and has a small size and light weight, i.e., a width thereof is about 10 cm or less, height thereof is about 18 cm or less, thickness thereof is about 2 cm, and weight thereof is about 300 g. Accordingly, the mobile PC 16 can be held in a pocket of the work clothing of the worker, holster to be attached to a belt, or a shoulder case, and is wearable. Although the mobile PC 16 incorporates therein semiconductor chips such as the CPU, semiconductor memory, and the like, and storage devices such as a Solid State Disk (SSD), and the like, the mobile PC 16 is not provided with a display device and hardware keyboard for input of characters.

On the front surface of the mobile PC 16, five buttons 202 constituted of an up button 202a, right button 202b, down button 202c, left button 202d, and decision button 202e (also called a center button or enter button) are arranged, and fingerprint sensor 204 is arranged below the five buttons 202. The mobile PC 16 is not provided with a hardware keyboard for input of characters, and a password number (also called a PIN) cannot be input. Therefore, the fingerprint sensor 204 is used for user authentication at the time of login of the mobile PC 16. A command can be input from the five buttons 202.

User authentication at the time of login may be carried out by allocating numeric characters to the buttons 202a to 202d of the five buttons 202, and inputting a password number by using the five buttons 202. In this case, the fingerprint sensor 204 can be omitted. Numeric characters are allocated to the four buttons other than the decision button 202e, and the number of the numeric characters is only four. Thus, there is a possibility of numeric characters input in a random manner being coincident with the password number. However, by making the digit number of the password number large, it is possible to make the probability that the numeric characters input in a random manner will be coincident with the password number low. Authentication by the five buttons 202 may be enabled in also a mobile PC 16 provided with a fingerprint sensor 204. Although one mobile PC 16 may be shared among a plurality of workers, it is not possible to cope with such a case by only the fingerprint authentication.

The operation procedures of the five buttons 202 are determined by the application program. For example,
when the decision button 202e is pressed once, item selection/item execution is carried out,
when the decision button 202e is pressed for a long time, ending or cancellation of an operation is carried out,
when the up button 202a is pressed once, the cursor is moved upward,
when the up button 202a is pressed for a long time, a list of activated application programs is displayed,
when the down button. 202c is pressed once, the cursor is moved downward,
when the down button. 202c is pressed for a long time, a menu of quick settings is displayed,
when the left button. 202d is pressed once, the right icon is selected, and
when the right button 202h is pressed once, the left icon is selected.

On the upper side surface of the mobile PC 16, a connector 206 conforming to the USE 3.0 standard, a connector 207 conforming to the USB type-C standard and a headphone/microphone port 208 are provided.

On one side face (side face on the left side when viewed from the front) of the mobile PC 16, a memory card slot 218 for a memory card is provided. The memory card includes, for example, an SD card, micro SD card (registered trade mark), and the like.

On the other side face (side face on the right side when viewed from the front) of the mobile PC 16, a slot 210 for Kensington Lock (registered trade mark), power switch 212, power LED 213, DC IN/battery LED 214, DC port 216, and ventilation holes 222 for cooling are provided. The power LED 213 is arranged around the power switch 212, and turned on during the period of power-on. The DC IN/battery LED 214 indicates the state of the mobile PC 16 such as whether or not the battery is being charged, and remaining battery level. Although the mobile PC 16 can be driven by the battery, the mobile PC 16 can also be driven in the state where the AC adaptor is connected to the DC port 216. Although not shown, the back side of the mobile PC 16 is configured such that the battery can be replaced with a new one by a one-touch operation.

Figure 4:
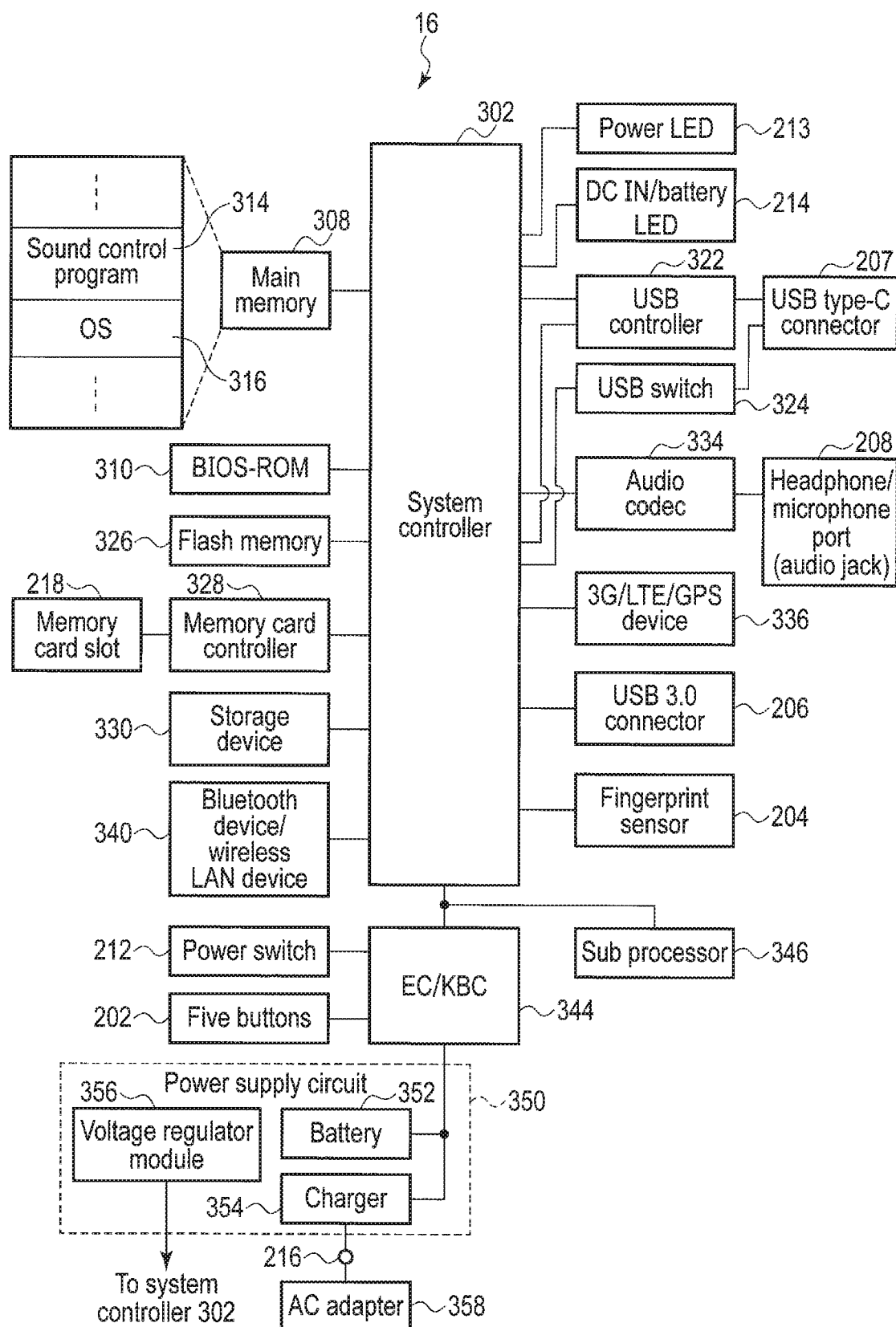
FIG. 4 is a block diagram showing an example of a system configuration of the electronic device of the first embodiment.

FIG. 4 shows an example of the system configuration of the mobile PC 16. The mobile PC 16 includes a system controller 302, and the system controller 302 includes a processor (CPU) and a controller hub. A main memory 308, a BIOS-ROM 310, the power LED 213, the DC IN/battery LED 214, and a USE controller 322 are connected to the processor. A Flash memory 326, a memory card controller 328, a storage device 330 including an HDD or an SSD, a USE switch 324, an audio codec 334, a 3G/LTE/GPS device 336, the fingerprint sensor 204, a USB 3.0 connector 206, a Bluetooth device/wireless LAN device 340, and an EC/KBC 344 are connected to the controller hub.

The system controller 302 executes various programs loaded from the storage device 330 into the main memory 308. These programs include an OS 316 and a sound control program 314 for control using sound data. The system controller 302 controls the operation of each component in the mobile PC 16 by executing instructions included in the sound control program 314.

The audio codec 334 converts a digital audio signal (sound data) into an analog audio signal and supplies (output) the converted analog audio signal to the headphone/microphone port 208 (also referred to as audio jack). Further, the audio codec 334 converts an analog audio signal input from the headphone/microphone port 208 into a digital audio signal. The headphone/microphone port 56 may be a speaker/microphone port. A plug provided at one end of the audio cable 5 is connected to the headphone/microphone port 208. It is possible to transmit and receive sound data between the display/setting PC 12 and the mobile PC 16 while the plug provided at the other end of the audio cable 5 is connected to the headphone/microphone port 56 of the display/setting PC 12.

Further, with each of the mobile PC 16 and the display/setting PC 12, instead of the headphone/microphone ports 208 and 506, a microphone port and a headphone port. (or a speaker port) may be separately provided. In this case, the headphone port of the mobile PC 16 and the microphone port of the display/setting PC 12 are connected by a first audio cable, and the microphone port of the mobile PC 16 and the headphone port of the display/setting PC 12 are connected by a second audio cable. As a result, sound data can be transmitted from the mobile PC 16 to the display/setting PC 12 via the first audio cable, and sound data can be transmitted from the display/setting PC 12 to the mobile PC 16 via the second audio cable.

Furthermore, one device may be provided with a headphone/microphone port and the other device may be provided with a headphone port and a microphone port. For example, in a case where the headphone/microphone port 208 is provided in the mobile PC 16, and the headphone port and the microphone port are provided in the display/setting PC 12, one end of the audio cable 5, which is a plug for the headphone/microphone port, is connected to the headphone/microphone port 208 of the mob to PC 16. The other end of the audio cable 5 branches into two, a plug for the headphone port is provided on one branched end, and a plug for the microphone port is provided on the other branched end. Therefore, the plug for the headphone port at the other end of the audio cable 5 is connected to the headphone port of the display/setting PC 12, and the plug for the microphone port is connected to the microphone port of the display/setting PC 12. Through such an audio cable 5, sound data can be transmitted from the mobile PC 16 to the display/setting PC 12, and sound data can be transmitted from the display/setting PC 12 to the mobile PC 16.

Further, for example, in a case where a headphone port and a microphone port are provided in the mobile PC 16, and the headphone/microphone port 56 is provided in the display/setting PC 12, one end of the audio cable 5, which is a plug for the headphone/microphone port, is connected to the headphone/microphone port 56 of the display/setting PC 12. The other end of the audio cable 5 branches into two, a plug for the headphone port is provided on one branched end, and a plug for the microphone port is provided on the other branched end. Therefore, the plug for the headphone port at the other end of the audio cable 5 is connected to the headphone port of the mobile PC 16, and the plug for the microphone post is connected to the microphone port of the mobile PC 16. Through such an audio cable 5, sound data can be transmitted from the mobile PC 16 to the display/setting PC 12, and sound data can be transmitted from the display/setting PC 12 to the mobile PC 16.

The memory card controller 328 accesses a memory card inserted into the memory card slot 218, for example, an SD card, and controls reading/writing of data from/to the SD card.

The USE controller 322 controls transmission and reception of data with respect to an USE type-C cable connected to the USE type-C connector 207 or a USE 3.0 cable (not shown) connected to the USE 3.0 connector 206.

Although not shown, a port extension adaptor including ports or connectors according to several interfaces can be connected also to the USE type-C connector 207, and an interface which is not provided in the mobile PC 16, such as the HDMI or the like, can be used.

The Bluetooth device/wireless LAN device 340 executes wireless communication conforming to the Bluetooth standard or wireless LAN communication conforming to the IEEE 802.11 standard for connection with an external device or a network. Note that the connection with the network may be performed by wired LAN communication conforming to the IEEE 802.3 standard instead of by wireless communication.

The fingerprint sensor 204 is used for fingerprint authentication at the time of startup of the mobile PC 16.

A sub-processor 346, the power switch 212, and the five buttons 202 are connected to the EC/KBC 344. The EC/KBC 344 has a function of turning on or turning off the power to the mobile PC 16 according to the operation of the power switch 212. The control of power-on and power-off is executed by the cooperative operation of the EC/KBC 344 and power circuit 350. Even during a power-off period of the mobile PC 16, the EC/KBC 344 operates by the power from a battery 352 or AC adaptor 358 connected as an external power supply. The power circuit 350 uses the power from the battery 352 or AC adaptor 358 to thereby generate power to be supplied to each component. The power circuit 350 includes a voltage regulator module 356. The voltage regulator module 356 is connected to the processor in the system controller 302.

[Setting Sequence]

Figure 5:
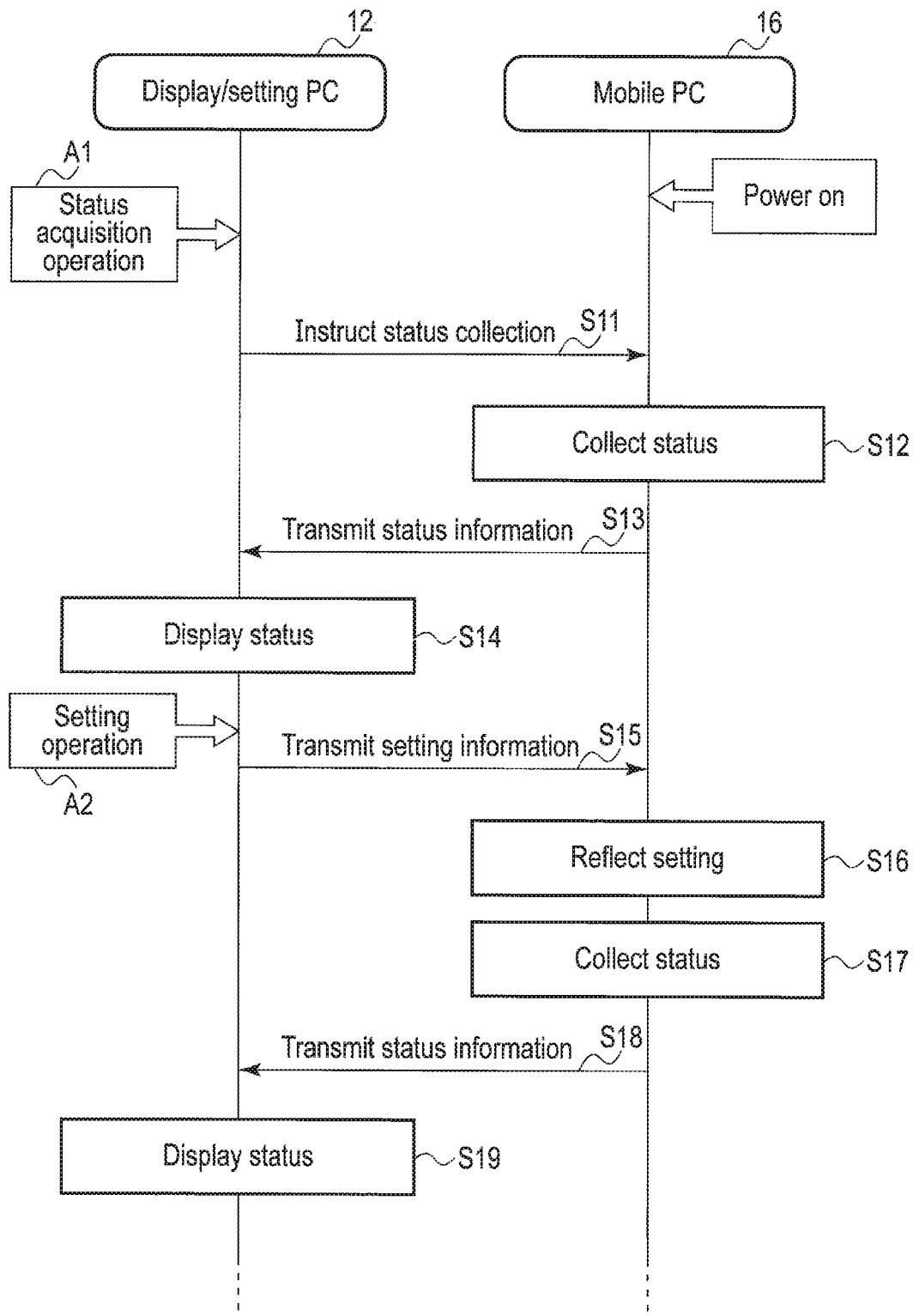
FIG. 5 is a diagram showing an example of a setting sequence executed in the control system of FIG. 1.

FIG. 5 shows an example of a setting sequence executed in the control system 1. Hereinafter, it is assumed that the display/setting PC 12 and the mobile PC 16 are connected via the and to cable 5.

First, in response to a user performing a status acquisition operation A1, the display/setting PC 12 transmits sound data encoded with information instructing a status collection to the mobile PC 16 in a power-on state (S11).

Next, the mobile PC 16 receives the sound data transmitted by the display/setting PC 12, and collects the status of the mobile PC 16 in accordance with the information instructing the status collection obtained by decoding the sound data (S12). The status of the mobile PC 16 includes the state and setting of each component (module) in the mobile PC 16, for example, the connection status (connected access points etc.) of various networks such as a wireless LAN, Bluetooth, and a 3G/LTE, the state of the battery 352, the supply state of the power, the version information of the firmware, and the like. The mobile PC 16 transmits the sound data encoded with the status information indicative of the collected status to the display/setting PC 12 (S13).

The display/setting PC 12 receives the sound data transmitted by the mobile PC 16, and displays, on the screen, the status information obtained by decoding the sound data (S14). In this way, the user can check the status of the mobile PC 16 and examine changes in settings and the like.

Then, in response to a setting operation A2 related to the setting performed by the user, the display/setting PC 12 transmits sound data encoded with the setting information corresponding to the setting operation A2 to the mobile PC 16 (S15). The setting operation A2 includes, for example, an operation for changing settings of various networks such as a wireless LAN of the mobile PC 16 (for example, changing an access point), a time to shift to a sleep state, power management setting, and the like.

The mobile PC 16 receives the sound data transmitted by the display/setting PC 12 and reflects the setting, based on the setting information obtained by decoding the sound data on the mobile PC 16 (S16). After the setting is reflected, the mobile PC 16 collects the status of the mobile PC 16 (S17). The mobile PC 16 transmits sound data encoded with the status information indicative of the collected status to the display/setting PC 12 (S18).

The display/setting PC 12 receives the sound data transmitted by the mobile PC 16, and displays, on the screen, the status information obtained by decoding the sound data (S19). As a result, the user can check whether the setting according to the setting operation A2 has been reflected in the status of the mobile PC 16.

As described above, by using the sound data mutually transmitted and received between the display/setting PC 12 and the mobile PC 16, in the display/setting PC 12, the status of the mobile PC 16 can be checked, the operation related to the setting of the mobile PC 16 can be performed, and the setting can be reflected on the mobile PC 16. Therefore, the control regarding the status of the mobile PC 16 can be performed in the control system 1 by using the connection between the display/setting PC 12 and the mobile PC 16 via the audio cable 5 attached to the sound input/output ports (for example, headphone/microphone ports 56 and 208).

[Functional Configuration of Display/Setting PC 12]

Figure 6:
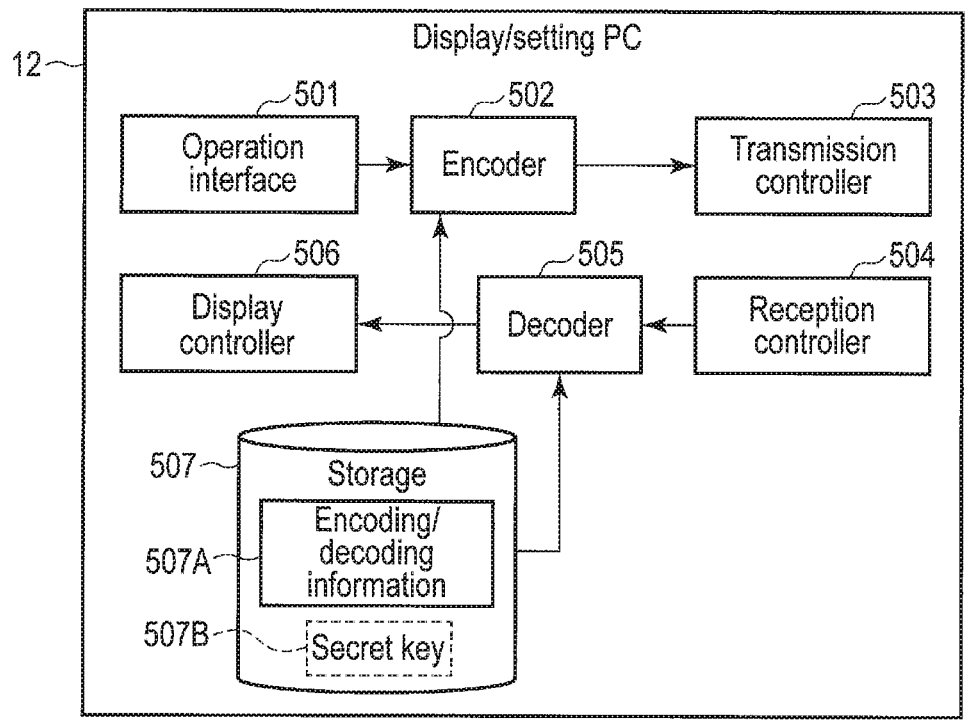
FIG. 6 is an exemplary block diagram showing a functional configuration of the display setting PC of FIG. 2.

FIG. 6 shows an example of a functional configuration of the display/setting PC 12. The display/setting PC 12 includes, for example, an operation interface 501, an encoder 502, a transmission controller 503, a reception controller 504, a decoder 505, a display controller 506, and a storage 507. These modules 501, 502, 503, 504, 505, 506, and 507 are implemented by the system controller 42 (processor) of the display/setting PC 12 executing instructions included in the sound control program 48 and controlling the operation of each component shown as the system configuration of the display/setting PC 12. The system configuration of the display/setting PC 12 is described above with reference to FIG. 2.

In a case where the user performs an operation using various input devices, the operation interface 501 accepts an input according to the operation. The user inputs information for controlling the status of the mobile PC 16 using various input devices such as the keyboard 88 and the touch panel 70. More specifically, the user can input an operation for instructing the collection of the status of the mobile PC 16, an operation on setting of the mobile PC 16, and the like. The operation interface 501 outputs information corresponding to the accepted operation to the encoder 502.

The encoder 502 generates sound data encoded with information indicative of an operation based on a specific encoding/decoding method. This encoding/decoding method is a method determined in advance between the display/setting PC 12 and the mobile PC 16, and includes a method for encoding information into sound data, and a method for decoding sound data into information. Further, this encoding/decoding method may be any method as long as it can convert (encode) information into sound data and further convert (decode) the sound data into original information.

Information 507A for encoding/decoding based on this encoding/decoding method is shared by the display/setting PC 12 and the mobile PC 16, and is stored in the storage 507, for example. For example, part of the storage area of the storage device 52 is allocated to the storage 507. The encoder 502 generates sound data encoded with information indicative of an operation using this encoding/decoding information 507A.

The transmission controller 503 transmits the sound data generated by the encoder 502 to the headphone/microphone port 56, thereby transmitting the sound data to the mobile PC 16 via the audio cable 5. Further, a case where sound data transmitted from the mobile PC 16 via the audio cable 5 is input to the headphone/microphone port 56, the reception controller 504 receives the sound data.

As described above, in the display/setting PC 12, the microphone port and the headphone port may be separately provided. In this case, the transmission controller 503 transmits the sound data to the headphone port, thereby transmitting the sound data to the mobile PC 16 via the audio cable 5. Further, in a case where the sound data transmitted from the mobile PC 16 via the audio cable 5 is input to the microphone port, the reception controller 504 receives the sound data.

The decoder 505 acquires information by decoding the received sound data based on the above-described encoding/decoding method. The decoder 505 decodes the sound data using, for example, the encoding/decoding information 507A in the storage 507. The acquired information is, for example, the status information of the mobile PC 16.

The display controller 506 displays the information obtained by decoding the sound data, on the screen of the LCD 64. For example, in a case where the information obtained by decoding is status information of the mobile PC 16, the display controller 506 displays the status information on the screen. In this way, the user can check the status of the mobile PC 16 and examine changes in settings and the like.

With the above configuration, it is possible to request the mobile PC 16 to instruct collection and setting of status information using the sound data.

[Functional Configuration of Mobile PC 16]

Figure 7:
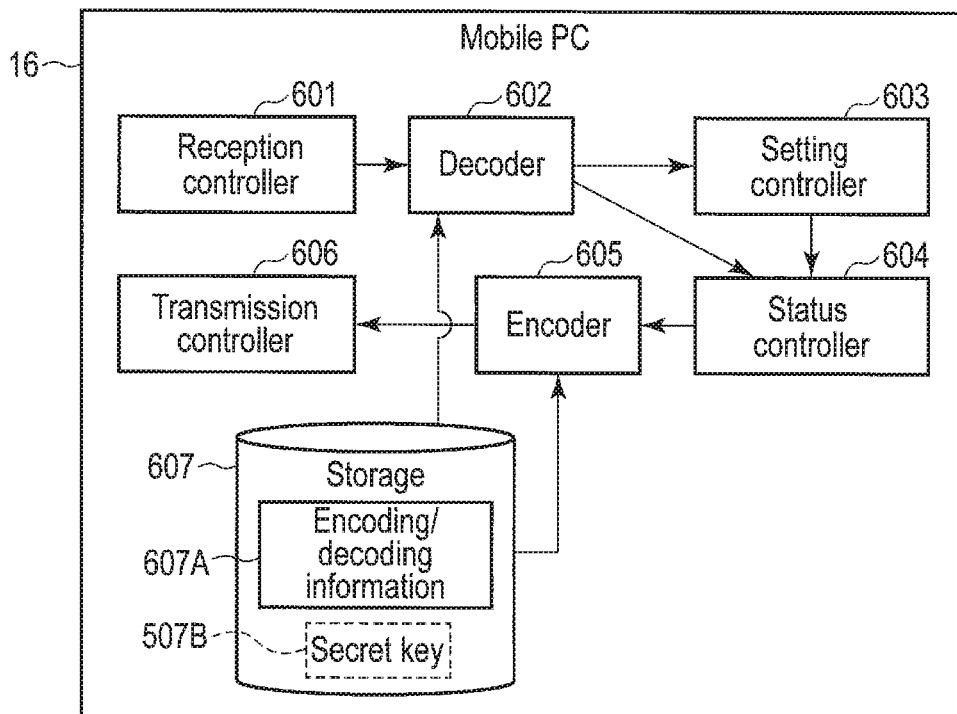
FIG. 7 is an exemplary block diagram showing a functional configuration of the electronic device of the first embodiment.

FIG. 7 shows an example of a functional configuration of the mobile PC 16. The mobile PC 16 includes, for example, a reception controller 601, a decoder 602, a setting controller 603, a status collector 604, an encoder 605, a transmission controller 606, and a storage 607. These modules 601, 602, 603, 604, 605, 606, and 607 are implemented by the system controller 302 (processor) of the mobile PC 16 executing instructions included in the sound control program 314 and controlling the operation of each component shown as the system configuration of the mobile PC 16. The system configuration of the mobile PC 16 is described above with reference to FIG. 4.

In a case where sound data transmitted from the display/setting PC 12 via the audio cable 5 is input to the headphone/microphone port 208, the reception controller 601 receives the sound data.

The decoder 602 acquires information by decoding the received sound data based on the specific encoding/decoding method. The acquired information is, for example, information indicative of an instruction of status collection, information indicative of setting, and the like. The encoding/decoding method is described above with reference to FIG. 6. Information 607A for encoding/decoding based on this encoding/decoding method is stored in the storage 607, for example. For example, part of the storage area of the storage device 330 is allocated to the storage 607.

In a case where the information acquired by the decoder 602 indicates the instruction of status collection, the status collector 604 acquires status information indicative of the status of the mobile PC 16.

Further, in a case where the information acquired by the decoder 602 indicates the setting, the setting controller 603 reflects the setting on the mobile PC 16. The setting controller 603, for example, changes the setting of each component (module) in the mobile PC 16 according to the setting indicated in the acquired information. Note that after the setting is reflected, the status collector 604 may further acquire status information indicative of the status of the mobile PC 16.

Based on the above-described encoding/decoding method, the encoder 605 generates sound data encoded with the status information acquired by the status collector 604. The encoder 605 encodes the status information using, for example, encoding/decoding information 607A in the storage 607.

The transmission controller 606 transmits the sound data generated by the encoder 605 to the headphone/microphone port 208, thereby transmitting the sound data to the display/setting PC 12 via the audio cable 5.

As described above, in the mobile PC 16, the microphone port and the headphone port may be separately provided. In this case, in a case where sound data transmitted from the display/setting PC 12 via the audio cable 5 is input to the microphone port, the reception controller 601 receives the sound data. Further, the transmission controller 606 outputs sound data to the headphone port, thereby transmitting the sound data to the display/setting PC 12 via the audio cable 5.

With the above configuration, it is possible to transmit the status information or change the setting of the mobile PC 16 in response to a request by the display/setting PC 12 using sound data.

[Sound Control Processing by Display/Setting PC 12]

Figure 8:
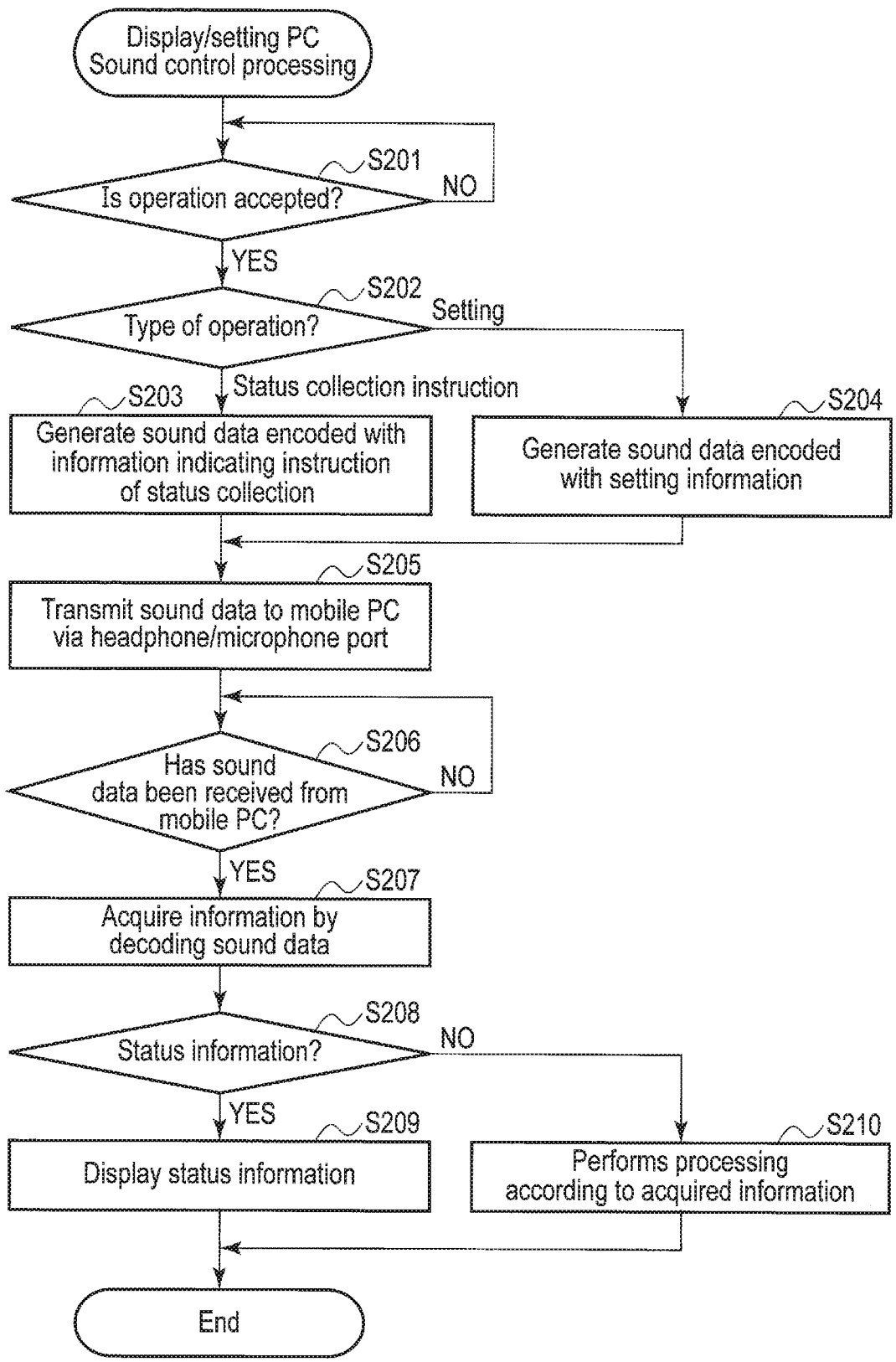
FIG. 8 is a flowchart showing an example of a procedure of a sound control processing executed by the display/setting PC of FIG. 2.

An example of the procedure of the sound control processing executed by the display/setting PC 12 will be described with reference to the flowchart in FIG. 8.

First, the display/setting PC 12 determines whether to accept an operation related to the mobile PC 16 (step S201). The display/setting PC 12 can accept an operation related to the mobile PC 16. The operation is inputted using the keyboard 88, the touch panel 70, or the like. In a case where the display/setting PC 12 has not accepted the operation related to the mobile PC 16 (No in step S201), the processing returns to step S201 and again it is determined whether the operation related to the mobile PC 16 is accepted.

In a case where the display/setting PC 12 has accepted the operation related to the mobile PC 16 (Yes in step S201), the display/setting PC 12 discriminates the type of the accepted operation (step S202). In a case where the accepted operation is an operation instructing status collection (status collection instruction in step S202), the display/setting PC 12 generates sound data encoded with information indicative of an instruction of status collection (step S203). On the other hand, in a case where the accepted operation is an operation instructing setting (setting in step S202), the display/setting PC 12 generates sound data encoded with information indicative of setting (step S204).

After the procedure of step S203 or step S204, the display/setting PC 12 transmits the generated sound data to the mobile PC 16 via the headphone/microphone port 56 (step S205).

Next, the display/setting PC 12 determines whether to receive sound data from the mobile PC 16 via the headphone/microphone port 56 (step S206). In a case where the display/setting PC 12 has not received the sound data from the mobile PC 16 (No in step S206), the processing returns to step S206 and again it is determined whether the display/setting PC 12 receives the sound data from the mobile PC 16.

On the other hand, in a case where the display/setting PC 12 has received the sound data from the mobile PC 16 (Yes in step S206), the display/setting PC 12 acquires information by decoding the received sound data (step S207). Then, the display/setting PC 12 determines whether the acquired information is status information (step S208). In a case where the acquired information is status information (Yes in step S208), the display/setting PC 12 displays the status information on the screen (step S209), and the processing is ended.

On the other hand, in a case where the acquired information is not status information (No in step S208), the display/setting PC 12 performs processing according to the acquired information (step S210) and the processing is ended.

Through the above processing, the display/setting PC 12 can request the mobile PC 16 to instruct collection and setting of status information using the sound data. Further, the display/setting PC 12 can receive the status information from the mobile PC 16 using the sound data and display the status information on the screen.

[Sound Control Processing by Mobile PC 16]

Figure 9:
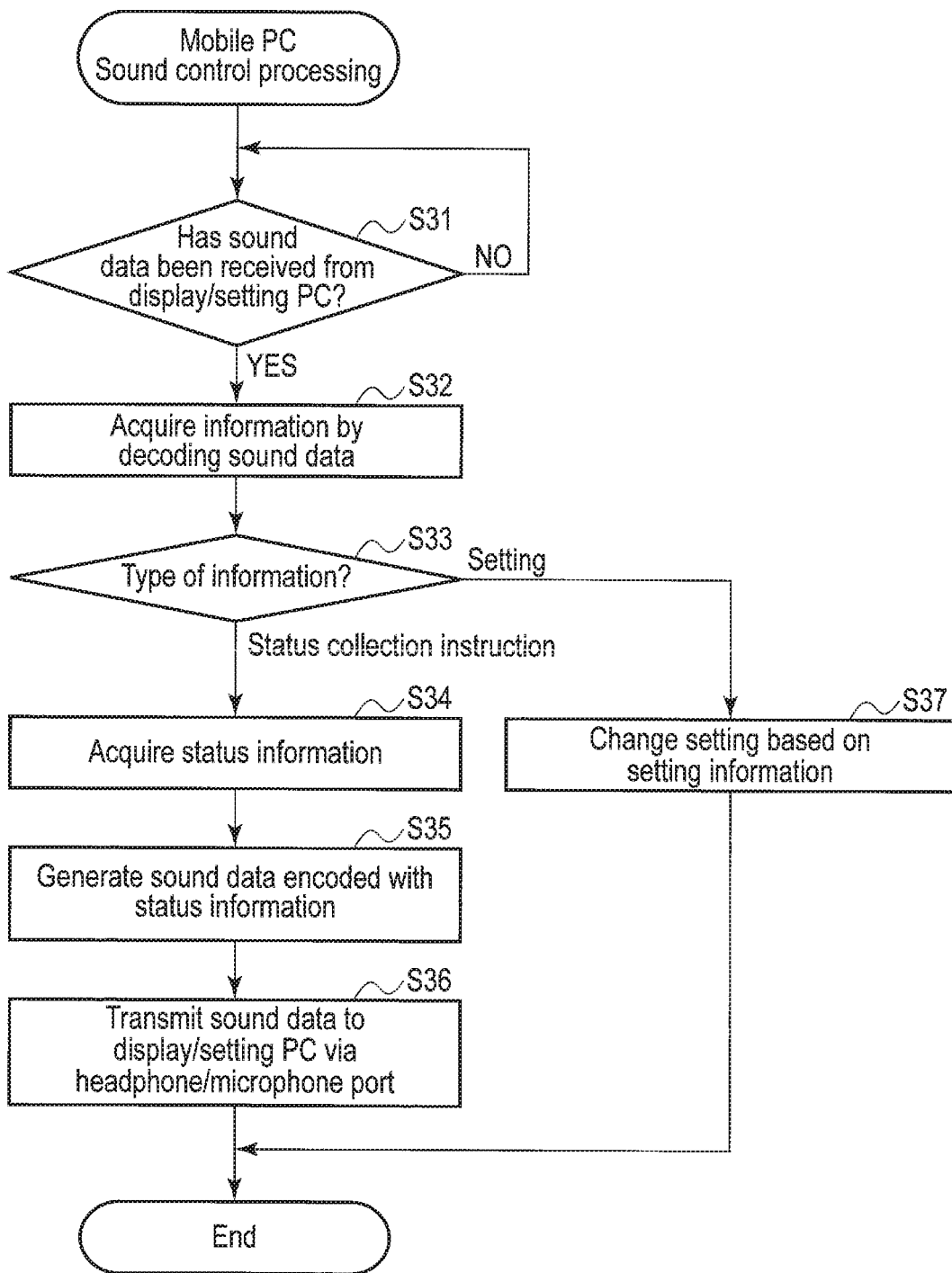
FIG. 9 is a flowchart showing, an example of a procedure of a sound control processing executed by the electronic device of the first embodiment.

An example of the procedure of the sound control processing executed by the mobile PC 16 will be described with reference to the flowchart in FIG. 9.

First, the mobile PC 16 determines whether to receive sound data from the display/setting PC 12 via the headphone/microphone port 208 (step S31). In a case where the mobile PC 16 has not received the sound data from the display/setting PC 12 (No in step S31), the processing returns to step S31 and again it is determined whether the mobile PC 16 receives the sound data from the display/setting PC 12.

On the other hand, in a case where the mobile PC 16 has received the sound data from the display/setting PC 12 (Yes in step S31), the mobile PC 16 acquires information by decoding the sound data (step S32). Then, the mobile PC 16 discriminates the type of the acquired information (step S33). In a case where the acquired information indicates an instruction of status collection (status collection instruction in step S33), the mobile PC 16 acquires status information of the mobile PC 16 (step S34). The mobile PC 16 generates sound data by encoding the acquired status information (step S35). Then, the mobile PC 16 transmits the generated sound data to the display/setting PC 12 via the headphone/microphone port 208 (step S36), and the processing is ended.

On the other hand, in a case where the information obtained by decoding the sound data indicates setting (setting in step S33), the mobile PC 16 changes the setting of each component (module) in the mobile PC 16 based on the setting (setting information) indicated in the information (step S37), and the processing is ended.

Through the above processing, the mobile PC 16 can transmit the status information to the display/setting PC 12 and change the setting of the mobile PC 16 in response to a request by the display/setting PC 12 using the sound data.

Note that the mobile PC 16 may output sound based on the sound data encoded with the status information, from a speaker (not shown) connected to the headphone/microphone port 208. In this case, the display/setting PC 12 uses the microphone (not shown) connected to the headphone/microphone port 56 to record the output sound. For example, the display/setting PC 12 can display, on the screen, the status information of the mobile PC 16 obtained by reproducing (decoding) the sound data generated by the recording.

Further, the display/setting PC 12 may output sound based on sound data encoded with a status collection instruction or setting, from a speaker (not shown) connected to the headphone/microphone port 56. In this case, the mobile PC 16 uses the microphone (not shown) connected to the headphone/microphone port 208 to record the output sound. In response to a request by the display/setting PC 12 obtained by reproducing (decoding) the sound data generated by the recording, the mobile PC 16 can output (transmits) sound data encoded with the status information, or change the setting of the mobile PC 16.

As described above, even when the display/setting PC 12 cannot access the mobile PC 16 via a network such as a wireless LAN or Bluetooth, even when use of the USB port and the display port of the mobile PC 16 is prohibited, and even when the status of the mobile PC 16 cannot be checked on the display connected to the mobile PC 16, transmission/reception of sound data via the audio cable 5 makes it possible to control the status of the mobile PC 16 from the display/setting PC 12.

Second Embodiment in the first embodiment, sound data encoded with a request and/or information is transmitted and received between the display/setting PC 12 and the mobile PC 16. In the second embodiment, a secret key for generating a one-time password is shared between the display/setting PC 12 and the mobile PC 16, and sound data encoded with a request and/or information and the one-time password is transmitted and received between the display/setting PC 12 and the mobile PC 16.

The configurations of the mobile PC 16 and the display/setting PC 12 provided in the control system according to the second embodiment are the same as those of the mobile PC 16 and the display/setting PC 12 of the first embodiment, and the procedure of the processing corresponding to the encoder 502 and the decoder 505, and the procedure of the processing corresponding to the decoder 602 and the encoder 605 of the mobile PC 16, are different between the second embodiment and the first embodiment. Only differences from the first embodiment will be described below.

[Setting Sequence]

Figure 10:
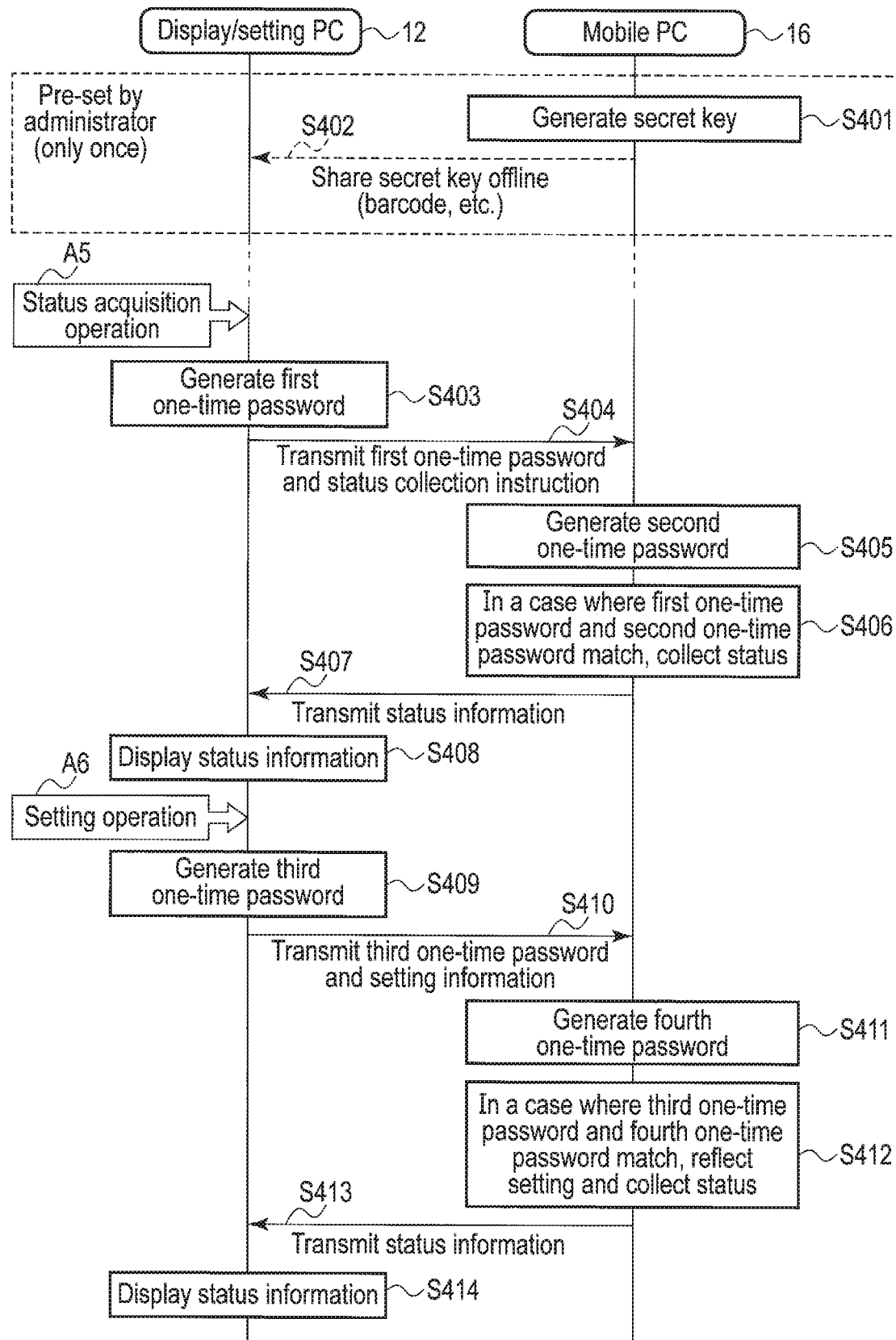
FIG. 10 is a diagram showing an example of a setting sequence executed in a control system including an electronic device according to the second embodiment.

FIG. 10 shows an example of a setting sequence executed in the control system 1. In this setting sequence, the security of the sound data transmitted and received between the display/setting PC 12 and the mobile PC 16 is protected.

First, the mobile PC 16 generates a secret key for generating a one-time password (S401). The secret key is generated only once, for example, according to a prior operation by the administrator. The one-time password generated using the secret key is, for example, an HMAC-based One-Time Password (HOTP), a Time-based One-Time Password (TOTP), or the like. The mobile PC 16 stores the generated secret key in a storage device 330 (storage 607) in the mobile PC 16.

Next, the mobile PC 16 shares the secret key offline with the display/setting PC 12 (S402). For example, the mobile PC 16 displays a barcode encoded with a secret key on a screen of a display connected to the mobile PC 16, and causes the setting PC 12 to read the displayed barcode, thereby causing a storage device 52 (storage 507) in the setting PC 12 to store the barcode. The display is, for example, a display connected to the mobile PC 16 via a display port (not shown) such as an HDMI port.

Alternatively, the mobile PC 16 stores data of the secret key in a portable storage medium such as a USB flash memory, and the storage medium is connected to the USB connector 72 or the like of the display/setting PC 12. Then, the display/setting PC 12 causes the storage device 52 to store the data of the secret key into the storage medium. As a result, the secret key is shared between the mobile PC 16 and the display/setting PC 12.

Note that the display/setting PC 12 may generate the secret key. In this case, the display/setting PC 12 can share the secret key offline with the mobile PC 16 in the same way as the above method.

In a state in which the secret key is shared, in response to a status acquisition operation A5 by the user, the display/setting PC 12 generate a first one-time password using the secret key stored in the display/setting PC 12 (S403). Then, the display/setting PC 12 transmits to the mobile PC 16 sound data encode with the first one-time password and information instructing status collection (S404).

In response to receiving the sound data transmitted by the display/setting PC 12, the mobile PC 16 generates a second one-time password using the secret key stored in the mobile PC 16 (S405). Then, when the first one-time password obtained by decoding the received sound data matches the generated second one-time password, the mobile PC 16 collects the status of the mobile PC 16 in accordance with the information instructing the status collection obtained by decoding the received sound data (S406). The status of the mobile PC 16 includes the state and setting of each component (module)) in the mobile PC 16, for example, the connection status (connected access points etc.) of various networks such as a wireless LAN, Bluetooth, and a 3G/LTE, the state of the battery 352, the supply state of the power supply, the version information of the firmware, and the like. The mobile PC 16 transmits sound data encoded with the status information indicative of the collected status to the display/setting PC 12 (S407).

The display/setting PC 12 receives the sound data transmitted by the mobile PC 16, and displays, on the screen, the status information obtained by decoding the sound data (S408). In this way, the user can check the status of the mobile PC 16 and examine changes in settings and the like.

Then, in response to a setting operation A6 related to setting the user, the display/setting PC 12 generates a third one-time password using the secret key (S409). Then, the display/setting PC 12 transmits to the mobile PC 16, sound data encoded with the third one-time password and the setting information corresponding to the setting operation A6 (S410). The setting operation A6 includes operations for changing, for example, a setting of various networks such as a wireless LAN of the mobile PC 16 (for example, changing an access point), a time to shift to a sleep state, a power management setting, and the like.

In response to receiving the sound data transmitted by the display/setting PC 12, the mobile PC 16 generates a fourth one-time password using the secret key (S411). Then, when the third one-time password obtained by decoding the received sound data matches the generated fourth one-time password, the mobile PC 16 reflects the setting, based on the setting information obtained by decoding the sound data on the mobile PC 16, and thereafter, collects the status of the mobile PC 16 (S412). The mobile PC 16 transmits sound data encoded with the status information indicative of the collected status to the display/setting PC 12 (S413).

The display/setting PC 12 receives the sound data transmitted by the mobile PC 16, and displays, on the screen, the status information obtained by decoding the sound data (S414). As a result, the user can check whether the setting according to the setting operation A6 has been reflected in the status of the mobile PC 16.

As described above, by using the sound data mutually transmitted and received between the display/setting PC 12 and the mobile PC 16, in the display/setting PC 12, the status of the mobile PC 16 can be checked, the operation related to the setting of the mobile PC 16 can be performed, and the setting can be reflected on the mobile PC 16. Therefore, the control regarding the status of the mobile PC 16 can be performed in the control system 1 by using the connection between the display/setting PC 12 and the mobile PC 16 via the audio cable 5 attached to the sound input/output ports (for example, headphone/microphone ports 56 and 208).

Furthermore, the configuration is such that, by including the one-time password based on the secret key shared between the display/setting PC 12 and the mobile PC 16 in the sound data, the mobile PC 16 is controlled only by the sound data generated by the display/setting PC 12 having the secret key. Therefore, it is possible to prevent the mobile PC 16 from being controlled by an unintended sound data (for example, sound data output by another PC, etc.) by a third party.

In the above example, sound data transmitted from the display/setting PC 12 to the mobile PC 16 is encoded with a one-time password and information. Sound data transmitted from the mobile PC 16 to the display/setting PC 12 is encoded with information only, and is not encoded with a one-time password. However, the sound data transmitted from the mobile PC 16 to the display/setting PC 12 may be encoded with both the one-time password and the information. In this case, the configuration can be such that for example, in response to the receipt of the sound data from the mobile PC 16, the display/setting PC 12 generates a one-time password, and displays status information obtained by decoding the sound data when the one-time password obtained by decoding the sound data matches the generated one-time password. Therefore, only when the sound data generated by the mobile PC 16 having the secret key is received, the status information of the mobile, PC 16 can be displayed on the screen of the display/setting PC 12.

[Functional. Configuration of Display/Setting PC 12]

The functions of the operation interface 501, the transmission controller 503, the reception controller 504, the decoder 505, and the display controller 506 are as described above with reference to FIG. 6. The storage 507 further stores a secret key 507B shared with the mobile PC 16.

The encoder 502 generates a one-time password using the secret key 507B. Then, the encoder 502 generates sound data encoded with the one-time password and information indicative of the operation accepted by the operation interface 501. The generated sound data is transmitted to the mobile PC 16 by the transmission controller 503.

Note that in a case where sound data transmitted from the mobile PC 16 to the display/setting PC 12 is encoded with a one-time password and information, the decoder 505 generates a one-time password using the secret key 507S in response to the receipt of the sound data by the reception controller 504. When the one-time password obtained by decoding the received sound data matches the generated one-time password, the decoder 505 requests the display controller 506 to display the status information obtained by decoding the sound data on the screen.

[Functional Configuration of Mobile PC 16]

The functions of the reception controller 601, the setting controller 603, the status collector 604, the encoder 605, and the transmission controller 606 are as described above with reference to FIG. 7. A secret key 507B shared with the display/setting PC 12 is stored in the storage 607.

In response to the receipt of sound data by the reception controller 601, the decoder 602 generates a one-time password using the secret key 507B stored in the storage 607. Then, when the one-time password obtained by decoding the received sound data matches the generated one-time password, the decoder 602 requests the setting controller 603 or the status collector 604 to perform processing corresponding to the information obtained by decoding the sound data. That is, if the information is information instructing status collection. The status collector 604 is requested to collect the status, and if the information is setting information, the setting controller 603 is requested to perform setting based on the setting information.

Note that in a case where sound data transmitted from the mobile PC 16 to the display/setting PC 12 is encoded with a one-time password and information, the encoder 605 generates a one-time password using the secret key 507B stored in the storage 607 in response to the acquisition of the status information by the status collector 604. Then, the encoder 605 generates sound data encoded with the generated one-time password and the status information. The generated sound data is, transmitted to the display/setting PC 12 by the transmission controller 606.

[Sound Control Processing by Display/Setting PC 12]

Figure 11:
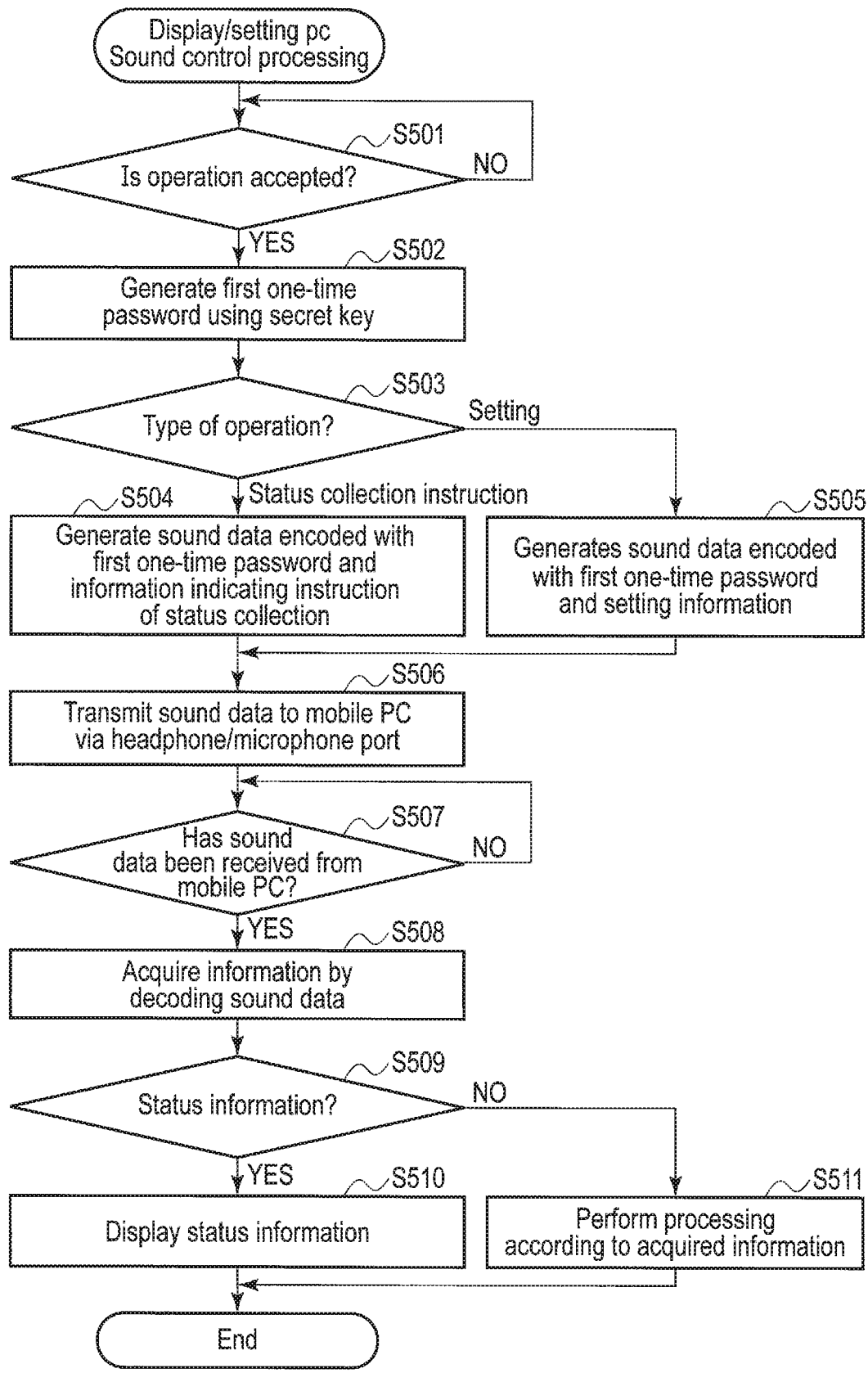
FIG. 11 is a flowchart showing an example of a procedure of a sound control processing executed by a display/setting PC included in the control system of FIG. 10.

An example of the procedure of the sound control processing executed by the display/setting PC 12 will be described with reference to the flowchart in FIG. 11.

First, the display/setting PC 12 determines whether to accept an operation with respect to the mobile PC 16 (step S501). The display/setting PC 12 can accept an operation related to the mobile PC 16. The operation inputted using the keyboard 88, the touch panel 70, or the like. In a case where the display/setting PC 12 has not accepted the operation related to the mobile PC 16 (No in step S501), the processing returns to step S501 and again it is determined whether operation related to the mobile PC 16 is accepted.

In a case where the display/setting PC 12 has accepted the operation related to the mobile PC 16 (Yes in step S501), the display/setting PC 12 generates a first one-time password using the secret key 507B shared with the mobile PC 16 (step S502). Then, the display/setting PC 12 discriminates the type of the accepted operation (step S503). In a case where the accepted operation is an operation instructing status collection (status collection instruction in step S503), the display/setting PC 12 generates sound data encoded with the first one-time password and information indicative of an instruction of status collection (step S504). On the other hand, in a case where the accepted operation is an operation instructing setting (setting in step S503), the display/setting PC 12 generates sound data encoded with the first one-time password and information indicative of the setting (step S505).

After the procedure of step S504 or step S505, the display/setting PC 12 transmits the generated sound data to the mobile PC 16 via a headphone/microphone port 56 (step S506).

Next, the display/setting PC 12 determines whether to receive the sound data from the mobile PC 16 via the headphone/microphone port 56 (step S507). In a case where the display/setting PC 12 has not received the sound data from the mobile PC 16 (No in step S507), the processing returns to step S507 and again it is determined whether the display/setting PC 12 receives the sound data from the mobile PC 16.

On the other hand, in a case where the display/setting PC 12 has received the sound data from the mobile PC 16 (Yes in step S507), the display/setting PC 12 acquires information by decoding the received sound data (step S508). Then, the display/setting PC 12 determines whether the acquired information is status information (step 3509). In a case where the acquired information is the status information (Yes in step S509), the display/setting PC 12 displays the status information on the screen (step S510), and the processing is ended.

On the other hand, in a case where the acquired information is not status information (No in step S509), the display/setting PC 12 performs processing according to the acquired information (step S511) and the processing is ended.

Through the above processing, the display/setting PC 12 can request the mobile PC 16 to instruct collection and setting of status information using the sound data encoded with the one-time password. Further, the display/setting PC 12 can receive the status information from the mobile PC 16 using the sound data and display the status information on the screen.

[Sound Control Processing by Mobile PC 16]

Figure 12:
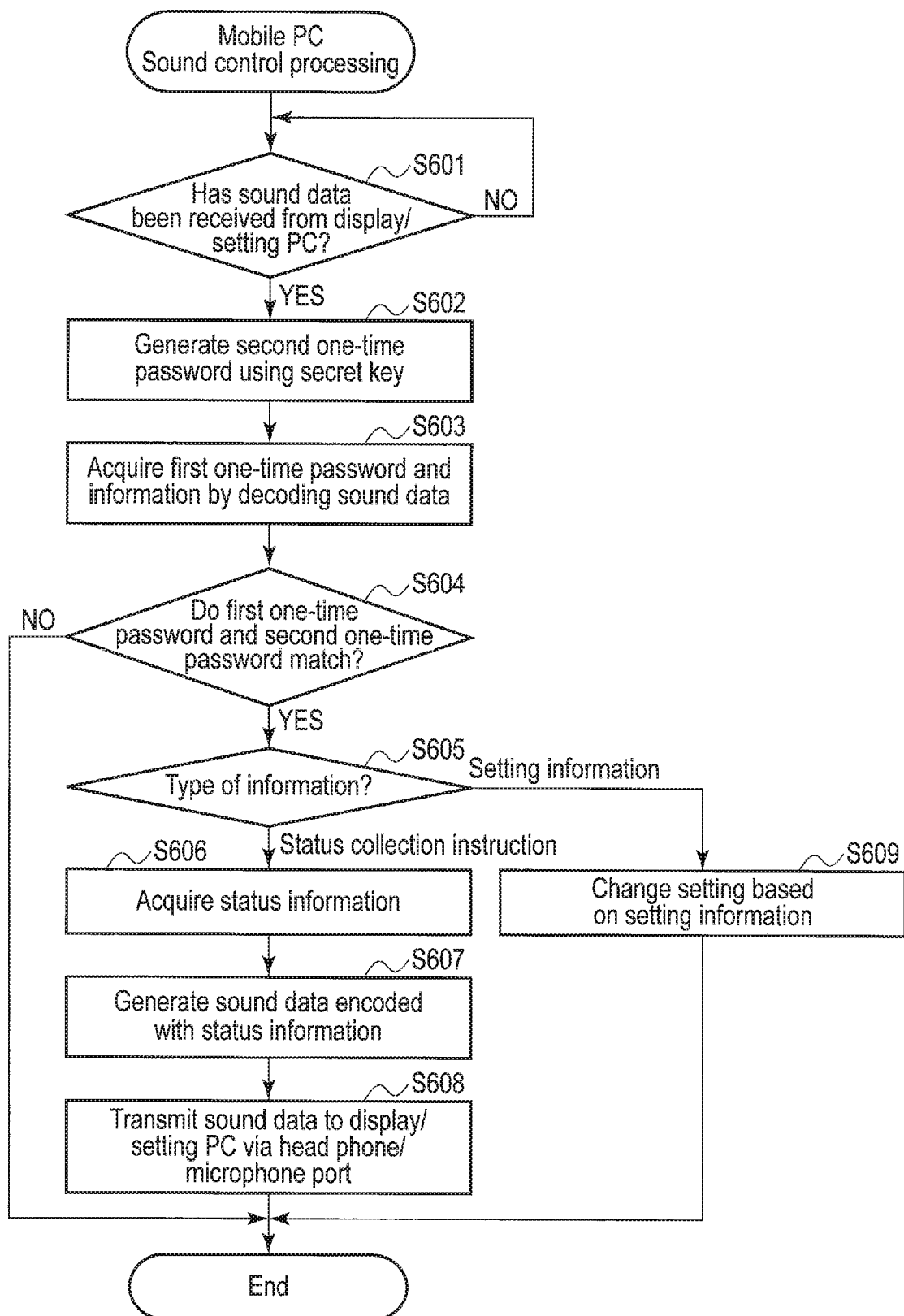
FIG. 12 is a flowchart showing an example of a procedure of a sound control processing executed by the electronic device of the second embodiment.

An example of the procedure of the sound control processing executed by the mobile PC 16 will be described with reference to the flowchart in FIG. 12.

First, the mobile PC 16 determines whether to receive sound data from the display/setting PC 12 via a headphone/microphone port 208 (step S601). In a case where the mobile PC 16 has not received the sound data from the display/setting PC 12 (No in step S601), the processing returns to step S601 and again it is determined whether the mobile PC 16 receives the sound data from the display/setting PC 12.

In a case where the mobile PC 16 receives sound data from the display/setting PC 12 (Yes in step S601), the mobile PC 16 generates a second one-time password using the secret key 507B (step S602). In addition, the mobile PC 16 acquires a first one-time password and information by decoding the received sound data (step S603).

Next, the mobile PC 16 determines whether the first one-time password matches the second one-time password (step S604). In a case where the first one-time password is generated using the secret key 507B shared between the mobile PC 16 and the display/setting PC 12, the first one-time password matches the second one-time password.

In a case where the first one-time password and the second one-time password do not match (No in step S604), the mobile PC 16 determines that the received sound data is unintended data and the processing is ended.

In a case where the first one-time password matches the second one-time password (Yes in step S604), the mobile PC 16 discriminates the type of the acquired information (step S605). In a case where the acquired information indicates the instruction of status collection (status collection instruction in step S605), the mobile PC 16 acquires status information of the mobile PC 16 (step S606). The mobile PC 16 generates sound data by encoding the acquired status information (step S607). Then, the mobile PC 16 transmits the generated sound data to the display/setting PC 12 via the headphone/microphone port 208 (step S608), and the processing is ended.

On the other hand, in a case where the information obtained by decoding the sound data indicates setting (setting in step S605), the mobile PC 16 changes the setting of each component (module) in the mobile PC 16 based on the setting (setting information) indicated in the information (step S609), and the processing is ended.

Through the above processing, in a case where the first one-time password included in the sound data received from the display/setting PC 12 matches the second one-time password generated by the mobile PC 16, the mobile PC 16 can transmit, as intended processing, the status information to the display/setting PC 12 and change the setting of the mobile PC 16 in response to a request by the display/setting PC 12 using the sound data.

Third Embodiment

In the first and second embodiments, the display/setting PC 12 and the mobile PC 16 are directly connected by the audio cable 5. In contrast, in the third embodiment, a mobile PC 16 is connected to a first telephone through a first audio cable, a display/setting PC 12 is connected to a second telephone through a second audio cable, and the first telephone and the second telephone are mutually connected via a telephone line network.

The configurations of the mobile PC 16 and the display/setting PC 12 provided in the control system according to the third embodiment are the same as those of the mobile PC 16 and the display/setting PC 12 of the first and second embodiments, and the differences between the third embodiment and the first and second embodiments are that the first telephone and the second telephone are further provided in the control system 1. The other end of the first audio cable connected to a headphone/microphone port 208 of the mobile PC 16 is connected to the first telephone instead of the display/setting PC 12. The other end of the second audio cable connected to a headphone/microphone port 56 of the display/setting PC 12 is connected to the second telephone instead of the mobile PC 16. Only differences from the first and second embodiments will be described below.

FIG. 13 is a diagram showing configuration of the control system 1 according to the third embodiment. As shown in FIG. 13, the control system 1 including the mobile PC 16, the display/setting PC 12, and two telephones 7A and 7B. The telephones 7A and 7B are provided with headphone/microphone ports 701A and 701B respectively. Note that a headphone port and a microphone port may be separately provided in each of the telephones 7A and 7B. The telephone 7A and the telephone 7B are mutually connected by a telephone line network 8.

The headphone/microphone port 208 of the mobile PC 16 and the headphone/microphone port 701A of the telephone 7A are connected via a first audio cable 5A. That is, a plug provided at one end of the first audio cable 5A is connected to the headphone/microphone port 208 of the mobile PC 16, and a plug provided at the other end of the first audio cable 5A is connected to the headphone/microphone port 701A of the telephone 7A.

Further, the headphone/microphone port 56 of the display/setting PC 12 and the headphone/microphone port 701B of the telephone 7B are connected via a second audio cable 5B. That is, a plug provided at one end of the second audio cable 5B is connected to the headphone/microphone port 56 of the display/setting PC 12, and a plug provided at the other end of the second audio cable 53 is connected to the headphone/microphone port 701B of the telephone 7B.

With such a connection, the mobile PC 16 transmits sound data to the display/setting PC 12 via the first audio cable 5A, the telephone line network 8 and the second audio cable 5B. The display/setting PC 12 receives the sound data from the mobile PC 16 via the first audio cable 5A, the telephone line network 8 and the second audio cable 5B.

Further, the display/setting PC 12 transmits sound data to the mobile PC 16 via the second audio cable 5B, the telephone line network 8 and the first audio cable 5A. The mobile PC 16 receives the sound data from the display/setting PC 12 via the second audio cable 5B, the telephone line network 8 and the first audio cable 5A.

Thus, by connecting the mobile PC 16 to the telephone 7A, and connecting the display/setting PC 12 to the telephone 7B, it is possible for the mobile PC 16 and the display/setting PC 12 to transmit and receive sound data via the telephone line network 8, for example, even when they are in a remote place where it is difficult to connect with one audio cable. Therefore, it is possible to control the status of the mobile PC 16 from the display/setting PC 12 using the transmitted/received sound data.

As described above, according to the first to third embodiments, it is possible to control the status by the connection between the electronic devices using the audio cable. The mobile PC 16 generates first sound data encoded with status information indicative of the state of the mobile PC 16, and transmits the first sound data to the display/setting PC 12 via an audio cable 5. The display/setting PC 12 receives the first sound data from the mobile PC 16 via the audio cable 5, decodes the first sound data to thereby acquire the status information, and displays the status information on the screen.

Further, the display/setting PC 12 generates sound data encoded with setting information to be set to the mobile PC 16, and transmits the sound data to the mobile PC 16 via the audio cable 5. The mobile PC 16 receives the sound data from the display/setting PC 12 via the audio cable 5, decodes the sound data to thereby acquire the setting information, and changes the setting of the mobile PC 16 using the acquired setting information.

In this way, by transmitting and receiving the sound data via the connection between the devices using the audio cable 5, the status information of the mobile PC 16 is displayed on the screen of the display/setting PC 12, and the setting of the mobile PC 16 cart be changed based on the setting information transmitted by the display/setting PC 12. Therefore, even in the state or environment where the network is unavailable or the state where the use of the USE, port and the display port is prohibited, it is possible to read and set various statuses of the mobile PC 16 from the display/setting PC 12.

Further, each of the various functions described in some embodiments may be implemented by a circuit (processing circuit). Examples of processing circuits include programmed processors such as a central processing unit (CPU). This processor executes each of the described functions by executing computer programs (instructions) stored in the memory. The processor may be a microprocessor including an electrical circuit. Examples of processing circuits include a digital signal processor (DSP), an application specific integrated circuit (ASIC), a microcontrolier, a controller, and other electrical circuit components. Each of the components other than the CPU described in these embodiments may also be implemented by the processing circuit.

Further, since the various processing according to some embodiments can be implemented by a computer program, merely by installing this computer program in a computer through a computer readable storage medium in which this computer program is stored to execute the installed program, it is possible to easily implement the same effect as those of these embodiments.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A control system comprising a first electronic device and a second electronic device connected to the first electronic device via an audio cable,
    wherein the first electronic device is configured to:
        generate first sound data encoded with status information indicative of a state of the first electronic device; and
        transmit the first sound data to the second electronic device via the audio cable,
    wherein the second electronic device is configured to:
        receive the first sound data from the first electronic device via the audio cable;
        acquire the status information by decoding the first sound data; and
        display the status information on a screen,
        wherein the first sound data comprises data encoded with the status information and a first one-time password, and
    wherein the second electronic device is further configure to:
        acquire the status information and the first one-time password by decoding the first sound data; and
        generate a second one-time password, and display the status information on the screen in a case where the first one-time password matches with the second one-time password.

2. The control system of claim 1,
    wherein the second electronic device is configure to generate the second one-time password using a secret key shared between the first electronic device and the second electronic device, and
    wherein the first one-time password matches with the second one-time password in a case where the first one-time password is generated using the secret key.

3. The control system of claim 1, wherein
    the first electronic device comprises a first headphone/microphone port,
    the second electronic device comprises a second headphone/microphone port, and
    a first end of the audio cable is connected to the first headphone/microphone port and a second end of the audio cable is connected to the second headphone/microphone port.

4. The control system of claim 1, wherein
    the first electronic device comprises a first headphone port,
    the second electronic device comprises a second microphone port, and
    a first end of the audio cable is connected to the first headphone port, and a second end of the audio cable is connected to the second microphone port.

5. The control system of claim 1, wherein
    the second electronic device further:
        generates second sound data encoded with collection instruction information to instruct acquisition of the status information; and
        transmits the second sound data to the first electronic device via the audio cable, and
    the first electronic device further:
        receives the second sound data via the audio cable;
        acquires the collection instruction information by decoding the second sound data; and
        generates the first sound data encoded with the status information in response to acquisition of the collection instruction information.

6. A control system comprising a first electronic device and a second electronic device connected to the first electronic device via an audio cable,
    wherein the first electronic device is configured to:
        generate first sound data encoded with status information indicative of a state of the first electronic device; and
        transmit the first sound data to the second electronic device via the audio cable,
    wherein the second electronic device is configured to:
        receive the first sound data from the first electronic device via the audio cable;

acquire the status information by decoding the first sound data; and display the status information on a screen, wherein the first electronic device is connected to a first telephone through a first audio cable, wherein the second electronic device is connected to a second telephone via a second audio cable, wherein the first telephone and the second telephone are connected via a telephone line network, wherein the first electronic device is further configured to transmit the first sound data to the second electronic device via the first audio cable, the telephone line network and the second audio cable, and wherein the second electronic device is further configured to receive the first sound data from the first electronic device via the first audio cable, the telephone line network and the second audio cable.

7. A control method of controlling a system that comprises a first electronic device and a second electronic device connected to the first electronic device via an audio cable, the control method comprising:

generating sound data encoded with status information indicative of a state of the first electronic device;

transmitting the sound data from the first electronic device to the second electronic device via the audio cable;

acquiring the status information by decoding the sound data; and displaying the acquired status information on a screen of the second electronic device, wherein the sound data comprises data encoded with the status information and a first one-time password, and wherein the control method further comprises:

acquiring the status information and the first one-time password by decoding the sound data; and generating a second one-time password, and displaying the status information on the screen in a case where the first one-time password matches with the second one-time password.

8. An electronic device comprising:

a connection unit configured to connect the electronic device to an external electronic device via an audio cable; and a processor configured to:

receive first sound data from the external electronic device via the audio cable;

acquire status information indicative of a state of the external electronic device by decoding the first sound data;

display the status information on a screen;

generate second sound data encoded with setting information to be set in the external electronic device; and transmit the second sound data to the external electronic device via the audio cable, wherein the first sound data comprises data encoded with the status information and a first one-time password, and wherein the processor is further configure to:

acquire the status information and the first one-time password by decoding the first sound data; and generate a second one-time password, and display the status information on the screen in a case where the first one-time password matches with the second one-time password.

9. The electronic device of claim 8, wherein the processor is further configured to:

generate the first one-time password; and generate the second sound data encoded with the setting information and the first one-time password.

* * * * *